United States Patent
Guo et al.

(10) Patent No.: US 12,019,251 B2
(45) Date of Patent: Jun. 25, 2024

(54) ORBITAL ANGULAR MOMENTUM GENERATING APPARATUS FOR POLARIZATION MODULATION OF ORBITAL ANGULAR MOMENTUM AND METHOD THEREOF

(71) Applicant: NATIONAL QUANTUM COMMUNICATION (GUANGDONG) CO., LTD, Guangdong (CN)

(72) Inventors: Banghong Guo, Guangdong (CN); Yilong He, Guangdong (CN)

(73) Assignee: NATIONAL QUANTUM COMMUNICATION (GUANGDONG) CO., LTD, Zhaoqing (CN)

( * ) Notice: Subject to any disclaimer, the term of this patent is extended or adjusted under 35 U.S.C. 154(b) by 534 days.

(21) Appl. No.: 17/361,396

(22) Filed: Jun. 29, 2021

(65) Prior Publication Data

US 2022/0026729 A1 Jan. 27, 2022

Related U.S. Application Data

(63) Continuation of application No. PCT/CN2019/129493, filed on Dec. 27, 2019.

(30) Foreign Application Priority Data

Dec. 29, 2018 (CN) .......................... 201811652935.2

(51) Int. Cl.
G02B 27/28 (2006.01)
G02B 5/30 (2006.01)
G02B 5/32 (2006.01)

(52) U.S. Cl.
CPC .......... *G02B 27/286* (2013.01); *G02B 5/3083* (2013.01); *G02B 5/32* (2013.01); *G02B 27/283* (2013.01)

(58) Field of Classification Search
CPC .. G02B 27/286; G02B 27/283; G02B 5/3083; G02B 5/32
(Continued)

(56) References Cited

U.S. PATENT DOCUMENTS

2022/0029798 A1 * 1/2022 Guo ........................ H04B 10/54

FOREIGN PATENT DOCUMENTS

CN 101251665 A 8/2008
CN 101726868 A 6/2010
(Continued)

OTHER PUBLICATIONS

Qingsheng Xiao et al., Generation of Photonic Orbital Angular Momentum Superposition States Using Vortex Beam Emitters with Superimposed Gratings, Optics Express, Feb. 8, 2016, pp. 3168-3176, vol. 24, No. 4.
(Continued)

*Primary Examiner* — Joseph P Martinez
*Assistant Examiner* — Grant A Gagnon

(57) ABSTRACT

The disclosure provides an orbital angular momentum generating apparatus for polarization modulation of orbital angular momentum and method thereof, comprising a Gaussian light source module, a first orbital angular momentum modulation module, a second orbital angular momentum modulation module and a multiplexing module; when working, the Gaussian light source module generates a Gaussian light beam in any polarization state and enters the multiplexing module, which decomposes the Gaussian light beam into two component light components, both of which are respectively directed into the first or the second orbital
(Continued)

angular momentum modulation module, the modulation module respectively performs orbital angular momentum modulation on the two modulated light components, which return to the multiplexing module, the multiplexing module superposes the two component lights, and finally the orbital angular momentum state or the superposed state is output.

10 Claims, 3 Drawing Sheets

(58) Field of Classification Search
USPC .......................................................... 359/489
See application file for complete search history.

(56) References Cited

FOREIGN PATENT DOCUMENTS

| CN | 104007567 A | 8/2014 |
|----|-------------|--------|
| CN | 104065418 A | 9/2014 |

OTHER PUBLICATIONS

Alipasha Vaziri et al., Superpositions of the Orbital Angular Momentum for Applications in Quantum Experiments, Journal of Optics B: Quantum and Semiclassical Optics, Mar. 1, 2002, pp. S47-S51, vol. 4.

* cited by examiner

ORBITAL ANGULAR MOMENTUM GENERATING APPARATUS FOR POLARIZATION MODULATION OF ORBITAL ANGULAR MOMENTUM AND METHOD THEREOF

CROSS REFERENCE TO RELATED APPLICATIONS

The present application is a Continuation Application of PCT Application No. PCT/CN2019/129493 filed on Dec. 27, 2019, which claims the benefit of Chinese Patent Application No. 201811652935.2 filed on Dec. 29, 2018. All the above are hereby incorporated by reference in their entirety.

TECHNICAL FIELD

The disclosure relates to the technical field of quantum information and optical communication, in particular to an orbital angular momentum generating apparatus for polarization modulation of orbital angular momentum and method thereof.

BACKGROUND

Quantum cryptography is the information technology with provable security at present, and high-code-rate remote transmission is a difficult problem to be solved urgently in quantum cryptography. Scientists have discovered that multiplexing and modulating signals with multiple degrees of freedom and uncertainty relationships can expand transmission capacity and increase key rates. Orbital Angular Momentum (OAM) is an important degree of freedom for quantum cryptography modulation in addition to the degrees of freedom for polarization, phase, and wavelength. An optical beam with Orbital Angular Momentum (OAM) with phase factor exp (ilθ) carries lh orbital angular momentum, wherein θ is azimuth angle and l is the topological charge. Theoretically, the topological charge value l can be any integer value, and OAM states with different l values are orthogonal, so that an infinite-dimension Hilbert space can be constructed. These theoretical properties of OAM have made it have wide applications in the fields of quantum information, optical communications, optical micromanipulation, and biomedicine.

There are many devices and methods for generating an orbital angular momentum beam, such as a spiral phase plate, a spatial light modulator, a mode converter based on cylindrical lens, and a q-plate. However, these devices have their own limitations, for example: the spiral phase plate can only realize single-mode OAM; although the spatial light modulator can realize dynamic modulation of different OAM modes, the response rate of the spatial light modulator is generally below KHz, which greatly limits the application value of the spatial light modulator, and the device is large in size and not beneficial to integration; the q-plate can realize conversion between spin-orbit angular momentum, and generate corresponding OAM superposition states, but it is difficult to generate high-dimensional OAM, and the generated OAM mode is relatively single.

Meanwhile, in the prior art, Alipasha Vaziri realizes the preparation of OAM superposition state by using computer-generated hologram and interferometry methods but the generated mode is single and cannot be dynamically modulated (Alipasha Vaziri, atal. Superpositions of the orbital angular momentum for applications in quantum experiments. Journal of Optics B: Quantum and Semiclassical Optics, 2002, 4(2), 1-19.); the Xinlun CAI group of Sun Yat-Sen University produces an arbitrary OAM superposition state by integrating superimposed angle gratings in a single Whispering Gallery Mode (WGM) resonator, but the OAM superposition state it produces is directly related to the wavelength of the incident light, which limits its application in the field of communications (Xiao, Q, atal. Generation of photonic orbital angular momentum superposition states using vortex beam emitters with superimposed gratings. Optics Express, 2016, 24(4), 3168.); for example, in patent CN101251655A, the superposition of OAM states is implemented by using a diffraction grating and a davit prism, which can generate a plurality of orbital angular momentum reverse superposition states of different modes, but only static superposition states can be generated, but not dynamic modulated; the patent CN101726868A can dynamically generate OAM superposition state, but the generation rate is limited by the spatial modulator and is difficult to be integrated; although patent CN104065418A realizes an integrated orbital angular momentum mode transmitter, static superposition states still cannot be modulated dynamically. In the prior art, Chinese application CN104007567A provides a system method for generating a vortex light beam with tunable orbital angular momentum states, which uses a spiral phase plate to realize dynamic modulation of OAM, and improves the generation rate of OAM, but only a single OAM state can be generated, and a superposition state cannot be generated;

in summary, the existing technologies cannot satisfy the application of quantum coding and Quantum Key Distribution (QKD) in the future. It is urgently to further expand research and application of OAM, a device which has the advantages of compact structure, convenient integration, adjustable mode and capability of generating OAM state and superposition state at high speed.

DISCLOSURE OF DISCLOSURE

The present disclosure is directed to overcome the above-mentioned deficiencies of the prior art, and to provide an orbital angular momentum generating apparatus for polarization modulation of orbital angular momentum and method thereof; the disclosure uses a holographic grating switch, a spiral phase plate and a total reflector to form a round-trip light path, and realizes the specific orbital angular momentum state modulation by controlling the round-trip time of the light pulse circulation; the separation and coherent superposition of orthogonal polarization components are realized by utilizing a polarization beam splitter and a beam combiner; the orbital angular momentum generating apparatus for polarization modulation of orbital angular momentum and method thereof provided by the present disclosure not only can generate orbital angular momentum states with any topological charge number and superposed states thereof at high speed, but also have the characteristics of compact structure, convenient integration and lower manufacturing cost.

In order to achieve the above object, the present disclosure provides an orbital angular momentum generating apparatus for polarization modulation of orbital angular momentum, which comprises a gaussian light source module, a first orbital angular momentum modulation module, a second orbital angular momentum modulation module and a multiplexing module.

The Gaussian light source module comprises a pumping light source and a polarizer;

the pumping light source is used for generating Gaussian pulse light; the polarizer modulates the Gaussian pulse beam into a required polarization state;

the first orbital angular momentum modulation module comprises: a first delayer, a first quarter-wave plate, a first holographic grating switch, a first spiral phase plate and a first total reflector; the first holographic grating switch, the first spiral phase plate and the first total reflector are sequentially connected to form a first round-trip light path;

the second orbital angular momentum modulation module comprises: a second delayer, a second quarter-wave plate, a second holographic grating switch, a second spiral phase plate and a second total reflector; the second holographic grating switch, the second spiral phase plate and the second total reflector are sequentially connected to form a second round-trip light path;

the first delayer or the second delayer is used for compensating for the relative time difference caused by the cyclic round-trip modulation in the first orbital angular momentum modulation module or the second orbital angular momentum modulation module and ensuring the time consistency of two paths of components;

when the first quarter-wave plate or the second quarter-wave plate receives incident light, the incident linearly polarized light is converted into circularly polarized light, and when the circularly polarized light is reflected back by the first total reflector or the second total reflector and then passes through the first quarter-wave plate or the second quarter-wave plate again, the circularly polarized light is converted into linearly polarized light which is orthogonal to the polarization state during incidence, namely, the horizontally polarized light is converted into vertically polarized light;

the first holographic grating switch or the second holographic grating switch utilizes the holographic technology of laser, generates the Bragg grating in the crystal in a holographic form, realizes selective reflection of light by the Bragg grating, and has response speed reaching nanosecond magnitude. When a voltage is applied, the Bragg grating reflects the light beam; when no voltage is applied, the light beam is directly transmitted through the crystal; in practical application, other transmission-type or reflection-type optical switches can be used to replace the holographic grating switch;

the first spiral phase plate or the second spiral phase plate is a phase-only diffractive optical element with an optical thickness proportional to the rotational azimuth angle, the purpose of which is to control the phase of the transmitted beam, and the process is independent from polarization. When the gaussian beam passes through the transparent spiral phase plate, the change of the optical path of the transmitted beam caused by the spiral surface of the spiral phase plate is different, so that the change of the phase is different, and the transmitted beam generates a spiral phase factor with the topological charge number defined as $L_0$.

When a Gaussian light pulse enters the first orbital angular momentum modulation module or the second orbital angular momentum modulation module, the Gaussian light pulse firstly passes through the first delayer or the second delayer, then the first quarter-wave plate or the second quarter-wave plate rotates the polarization state of the light pulse for the first time, the light pulse enters the first round-trip light path or the second round-trip light path, thus realizing the modulation of the specific orbital angular momentum state by controlling the switching time of the first holographic grating switch or the second holographic grating switch; the modulated light pulse is emitted along the original light path, namely, the light pulse passes through the first quarter-wave plate or the second quarter-wave plate and the first delayer or the second delayer again; wherein every time the light pulse passes through the first spiral phase plate or the second spiral phase plate results in the absolute value of the topological charge number of orbital angular momentum plus $|L0|$; the modulated light pulses are emitted along the original light path and enter a beam combiner of the multiplexing module to be superposed to generate an orbital angular momentum state or a superposed state.

The multiplexing module comprises: a first polarization beam splitter, a second polarization beam splitter, a third polarization beam splitter, a half-wave plate and a beam combiner.

The first polarization beam splitter, second polarization beam splitter, or third polarization beam splitter transmits horizontally polarized light and reflects vertically polarized light.

The half-wave plate converts vertically polarized light into horizontally polarized light.

The beam combiner is configured to couple the vertically polarized light from the second polarization beam splitter and that from the third polarization beam splitter.

When the orbital angular momentum generating apparatus works, the Gaussian light source module generates a Gaussian light beam in any polarization state, the Gaussian light beam enters the multiplexing module, the multiplexing module decomposes the Gaussian light beam into two polarization components with one along the horizontal polarization directions and the other along the vertical polarization directions, both polarization components are respectively directed into the first orbital angular momentum modulation module or the second orbital angular momentum modulation module, the modulation module respectively performs polarization-independent orbital angular momentum modulation on the two components, the two light components return to the multiplexing module after they are modulated, the multiplexing module superposes the two component lights, and finally outputs an orbital angular momentum state or a superposed state.

The disclosure also provides an orbital angular momentum generating method for polarization modulation of orbital angular momentum, which comprises the following steps:

step S1: the gaussian light source module generates the corresponding polarization state $|\varphi\rangle_{IN}=a|H\rangle+\beta|V\rangle$ according to the orbital angular momentum state $|\varphi\rangle_{OUT}=a|L_1\rangle+\beta|L_2\rangle$ required to be generated, and transmits to the multiplexing module.

Step S2: when the generated polarization state enters the multiplexing module, the generated polarization state firstly enters the first polarization beam splitter and is divided into an upper branch and a right branch; the right branch passes through a second polarization beam splitter and is connected with the first orbital angular momentum modulation module; the upper branch passes through a half-wave plate and a third polarization beam splitter and is connected with a second orbital angular momentum modulation module; meanwhile, the state of light becomes: $|\varphi\rangle_1=a|H\rangle+\beta|V\rangle$.

Specifically, the upper branch is an upper light path of the first polarization beam splitter in the vertical direction; and the right branch is a right light path of the first polarization beam splitter in the horizontal direction.

Step S3: the first orbital angular momentum modulation module and second orbital angular momentum modulation module adjusts the delay parameters of the first delayer or the second delayer according to the orbital angular momentum state $|\varphi\rangle_{OUT}=\alpha|L_1\rangle+\beta|L_2\rangle$ required to be generated to ensure the time consistency of the two lights; wherein, $|L_1\rangle$ and $|L_2\rangle$ are orbital angular momentum states, $L_1$ and $L_2$ are topology loads, $\alpha^2+\beta^2=1$;

specifically, it is assumed that time of a round-trip light path formed by a first holographic grating switch or a second holographic grating switch, a first spiral phase plate or a second spiral phase plate, a first total reflector or a second total reflector is defined as $T_0$, and the topological load of the first spiral phase plate is added with $L_0$; then, the relative delay value of the first delayer and the second delayer $$\Delta T = \frac{1}{2}\left|\frac{L_2}{2L_0}T_0 - \frac{L_1}{2L_0}T_0\right|,$$

wherein $$\frac{L_2}{2L_0} \text{ and } \frac{L_1}{2L_0}$$

are integers.

Step S4: incident light simultaneously enters the first orbital angular momentum modulation module or the second orbital angular momentum modulation module, after a certain time delay, the first quarter-wave plate or the second quarter-wave plate performs polarization rotation on the polarization state for the first time, and then enters the round-trip light path formed by the first holographic grating switch or the second holographic grating switch, the first spiral phase plate or the second spiral phase plate and the first total reflector or the second total reflector for OAM modulation, wherein the light performs round-trip for $$\frac{L_1}{2L_0}$$

times in the first orbital angular momentum modulation module; the light performs round-trips for $$\frac{L_2}{2L_0}$$

times in the second orbital angular momentum modulation module; the modulated light pulse is emitted along the original light path, namely, passing through the first quarter-wave plate or the second quarter-wave plate and the first delayer or the second delayer again; wherein every time the light pulse passing through the first spiral phase plate or the second spiral phase plate results in the absolute value of the topological charge number of orbital angular momentum plus $|L0|$; the state of the light at this time becomes: $|\varphi\rangle_2=\alpha|V\rangle|L_1\rangle+\beta|V\rangle|L_2\rangle$.

Step S5: after time compensation of the delayer, the modulated light is reflected by the second or third polarization beam splitter at the same time and is coupled and output through the beam combiner; the final state of the light at this time becomes: $|\varphi\rangle_{OUT}=|V\rangle(\alpha|L_1\rangle+\beta|L_2\rangle)$.

The orbital angular momentum generating apparatus for polarization modulation of orbital angular momentum and method thereof have the advantages of compact structure, lower manufacturing cost, mature required devices and technology, capability of generating orbital angular momentum states and superposed states with any topological charge number at high speed, and high speed up to the magnitude of MHz, wherein the speed of the apparatus is only limited by the response time of the holographic grating switch.

Specifically, if the round-trip time $T_0$ is equal to the response time of the holographic grating $$\frac{1}{T_0 N};$$

switch $T_s$, and the preset maximum round-trip time is N, then the rate of the entire device is if N=8 and $T_0$=100 ns, the rate of the entire device can reach 1.25 MHz; the rate can even reach the order of GHz with the shortening of the switch response time $T_s$.

The beneficial effects of the disclosure are as follows:
(1) the technical scheme provided by the disclosure can realize state conversion between the polarization freedom degree and the OAM freedom degree, and output the corresponding orbital angular momentum state or the superposition state by directly regulating and controlling the polarization state of input light;
(2) the technical scheme provided by the disclosure can generate any orbital angular momentum state and a superposition state among any orbital angular momentum states, and the generation rate is greater than the magnitude of MHz and only limited by the response time of the holographic grating switch;
(3) the technical scheme provided by the disclosure can be compatible with high-power input light, and has the advantages of compact integral structure and low manufacturing cost.

Figure 1:
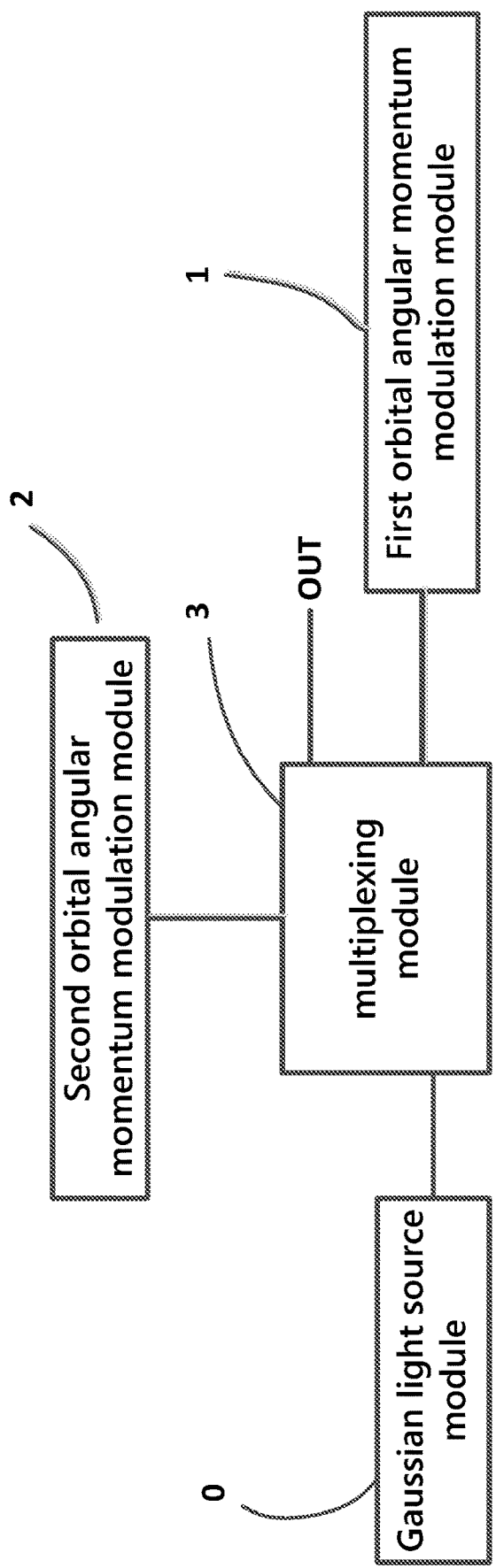
FIG. 1 is a block diagram of an apparatus according to an embodiment of the present disclosure.

DESCRIPTION OF THE REFERENCE NUMERALS 0 representing Gaussian light source module; 1 representing first orbital angular momentum modulation module; 2 representing second orbital angular momentum modulation module; 3 representing multiplexing module;

001 representing pump light source; 002 representing polarizer; 101 representing a first delayer; 102 representing first quarter-wave plate; 103 representing first holographic grating switch; 104 representing first spiral phase plate; 105 representing first total reflector;

201 representing second delayer; 202 representing second quarter-wave plate; 203 representing second holographic grating switch; 204 representing second spiral phase plate; 205 representing second total reflector;

301 representing first polarization beam splitter; 302 representing second polarization beam splitter; 303 representing third polarization beam splitter; 304 representing half-wave plate; 305 representing beam combiner.

DETAILED DESCRIPTION

The following description of the embodiments of the present disclosure will be made with reference to the accompanying drawings.

As shown in FIG. 1, the device for generating orbital angular momentum by polarization modulation provided by the present disclosure comprises a gaussian light source module 0, a first orbital angular momentum modulation module 1, a second orbital angular momentum modulation module 2 and a multiplexing module 3.

Figure 2:
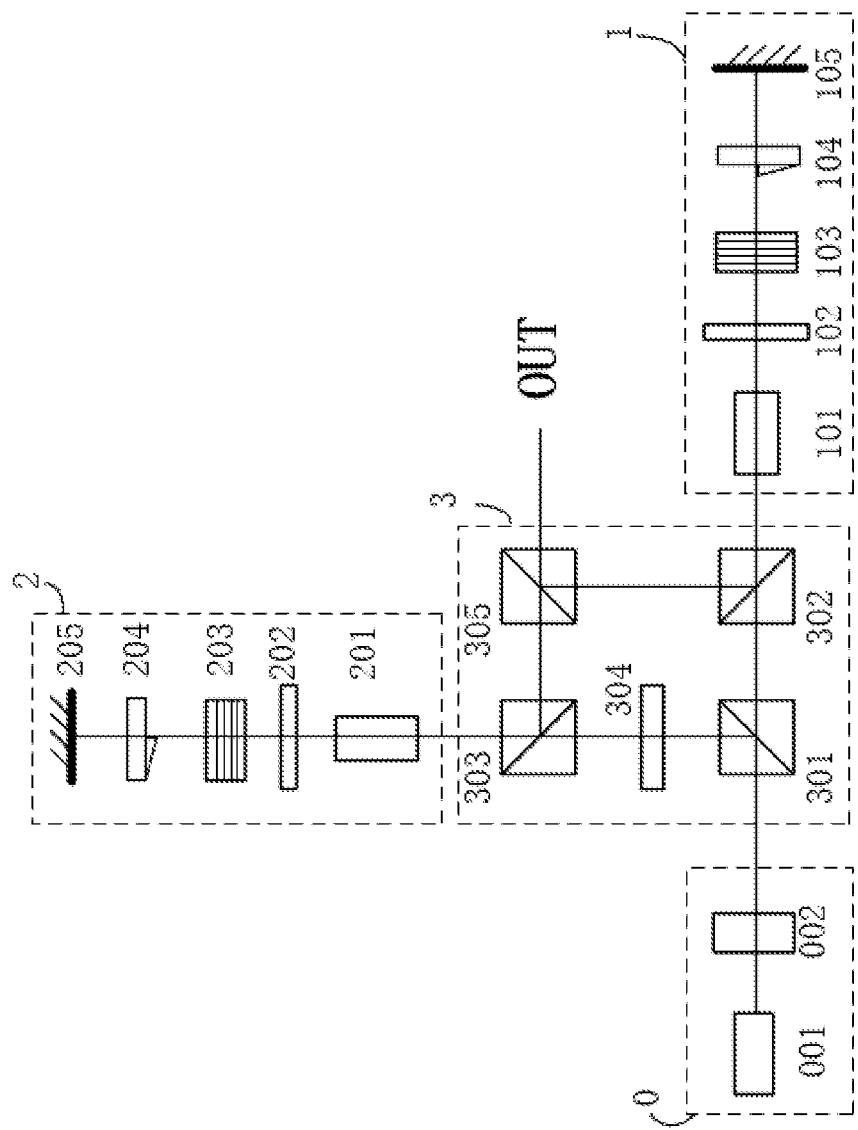
FIG. 2 is a schematic diagram of an apparatus according to an embodiment of the present disclosure.

As shown in FIG. 2, the Gaussian light source module comprises a pumping light source 001 and a polarizer 002; the pumping light source 001 generates Gaussian pulse light; the polarizer 002 modulates the Gaussian pulse beam into a required polarization state;

the first orbital angular momentum modulation module 1 comprises: a first delayer 101, a first quarter-wave plate 102, a first holographic grating switch 103, a first spiral phase plate 104 and a first total reflector 105;

the second orbital angular momentum modulation module 2 comprises: a second delayer 201, a second quarter-wave plate 202, a second holographic grating switch 203, a second spiral phase plate 204 and a second total reflector 205;

the first delayer 101 or the second delayer 201 is used for compensating for the relative time difference caused by the cyclic round-trip modulation in the first orbital angular momentum modulation module 1 or the second orbital angular momentum modulation module 2 and ensuring the time consistency of two paths of components;

when the first quarter-wave plate 102 or the second quarter-wave plate 202 receives incident light, the incident linearly polarized light is converted into circularly polarized light, and when the circularly polarized light is reflected back by the first total reflector 105 or the second total reflector 205 and then passes through the first quarter-wave plate 105 or the second quarter-wave plate 205 again, the circularly polarized light is converted into linearly polarized light which is orthogonal to the polarization state during incidence, namely, the horizontally polarized light is converted into vertically polarized light;

the first holographic grating switch 103 or the second holographic grating switch 203 utilizes the holographic technology of laser, generates the Bragg grating in the crystal in a holographic form, realizes selective reflection of light by the Bragg grating, and has response speed reaching nanosecond magnitude. When a voltage is applied, the Bragg grating reflects the light beam; when no voltage is applied, the light beam is directly transmitted through the crystal; in practical application, other transmission-type or reflection-type optical switches can be used to replace the holographic grating switch;

the first spiral phase plate 104 or the second spiral phase plate 204 is a phase-only diffractive optical element with an optical thickness proportional to the rotational azimuth angle, the purpose of which is to control the phase of the transmitted beam, and the process is independent from polarization. When the gaussian beam passes through the transparent spiral phase plate, the change of the optical path of the transmitted beam caused by the spiral surface of the spiral phase plate is different, so that the change of the phase is different, and the transmitted beam generates a spiral phase factor with the topological charge number defined as $L_0$.

When a Gaussian light pulse enters the first orbital angular momentum modulation module 1 or the second orbital angular momentum modulation module 2, the Gaussian light pulse firstly passes through the first delayer 101 or the second delayer 201, then the first quarter-wave plate 102 or the second quarter-wave plate 202 rotates the polarization state of the light pulse for the first time, the light pulse enters the first round-trip light path formed by the first holographic grating switch 103, the first spiral phase plate 104 and the first total reflector 105, or enters the second round-trip light path formed by the second holographic grating switch 203, the second spiral phase plate 204 and the second total reflector 205, thus realizing the modulation of the specific orbital angular momentum state by controlling the switching time of the first holographic grating switch 103 or the second holographic grating switch 203; the modulated light pulse is emitted along the original light path, namely, the light pulse passes through the first quarter-wave plate 102 or the second quarter-wave plate 202 and the first delayer 101 or the second delayer 201 again; wherein every time the light pulse passes through the first spiral phase plate 104 or the second spiral phase plate results 204 in the absolute value of the topological charge number of orbital angular momentum plus |L0|;

the multiplexing module 3 includes: a first polarization beam splitter 301, a second polarization beam splitter 302, a third polarization beam splitter 303, a half-wave plate 304, and a beam combiner 305.

The first polarization beam splitter 301, the second polarization beam splitter 302, or the third polarization beam splitter 303 transmits horizontally polarized light and reflects vertically polarized light.

The half-wave plate 304 converts vertically polarized light into horizontally polarized light.

The beam combiner 305 is configured to couple a vertically polarized light from the second polarization beam splitter 302 and that from the third polarization beam splitter 303.

The disclosure provides an orbital angular momentum generating apparatus for polarization modulation of orbital angular momentum, wherein Gaussian beams in any polarization state are generated by a Gaussian light source module 0, and the generated beams are decomposed into two polarization components with one along horizontal polarization directions and the other along the vertical polarization directions through a multiplexing module 3 consisting of polarization beam splitters 301, 302 and 303, a half-wave plate 304 and a beam combiner 305, both the horizontally polarization component and vertically polarization component are respectively directed into a first orbital angular momentum modulation module 1 or a second orbital angular momentum modulation module 2. The modulation module can respectively perform polarization-independent orbital angular momentum modulation on the two components by using the first spiral phase plate 104 and the second spiral phase plate 204, wherein the first holographic grating switch 103 or the second holographic grating switch 203, the first spiral phase plate 104 or the second spiral phase plate 204, and the first total reflector 105 or the second total reflector 205 jointly form a round-trip light path, and modulation of a specific orbital angular momentum state can be realized by controlling the switching time of the first holographic grating switch 103 or the second holographic grating switch 203. The two light components return to the multiplexing module 3 after they are modulated, the multiplexing module 3 superposes the two component lights, and finally outputs an orbital angular momentum state or a superposed state.

Figure 3:
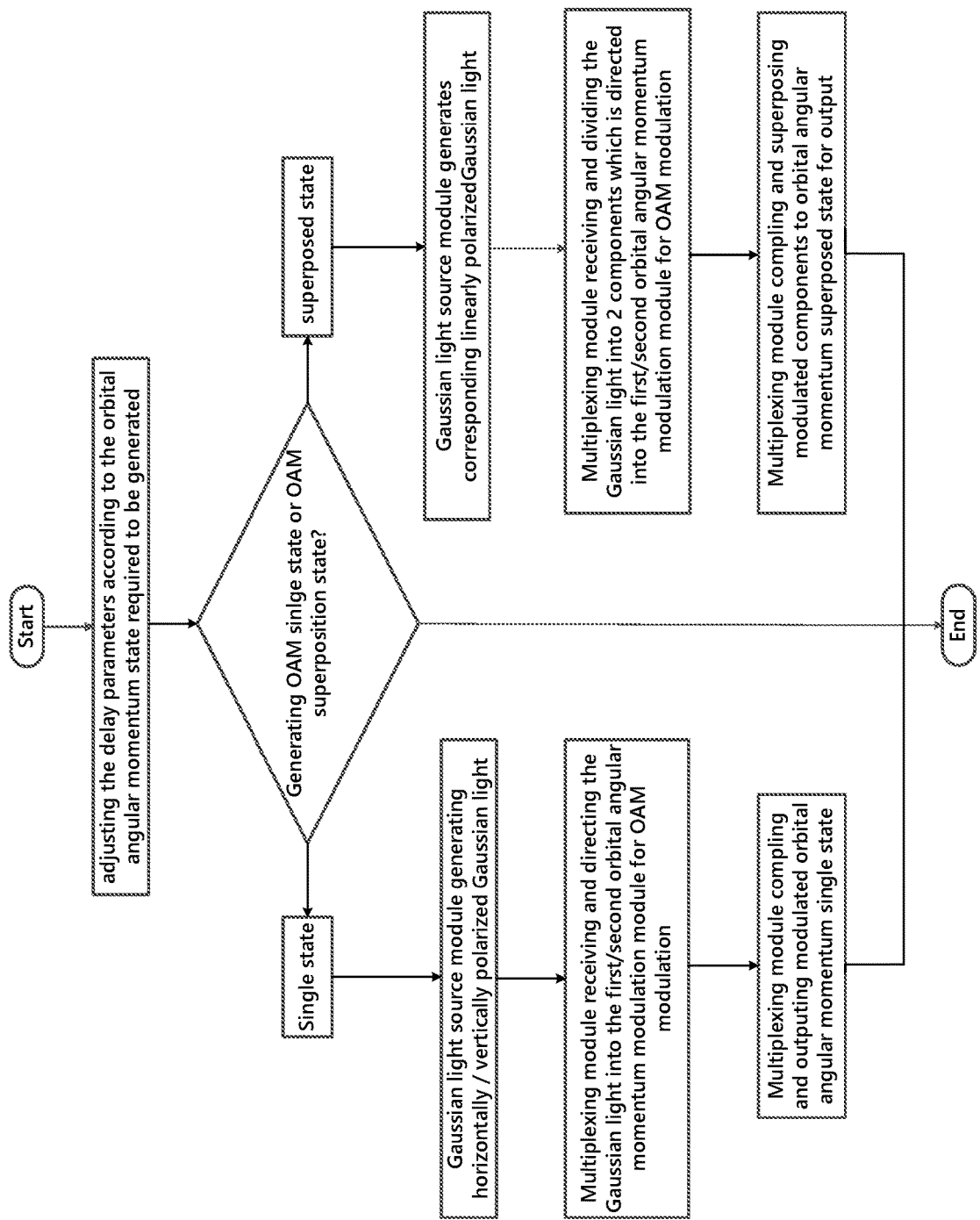
FIG. 3 is a flowchart of the method according to an embodiment of the present disclosure.

As shown in FIG. 3, an orbital angular momentum generating method for polarization modulation of orbital angular momentum, comprising the steps of:

step S1: the gaussian light source module 0 generates the corresponding polarization state $|\varphi\rangle_{IN}=a|H\rangle+\beta|V\rangle$ according to the orbital angular momentum state $|\varphi\rangle_{OUT}=a|L_1\rangle+\beta|L_2\rangle$ required to be generated, and transmits to the multiplexing module 3.

Step S2: when the generated polarization state enters the multiplexing module 3, the generated polarization state firstly enters the first polarization beam splitter 301 and is divided into an upper branch and a right branch; the right branch passes through a second polarization beam splitter 302 and is connected with the first orbital angular momentum modulation module 1; the upper branch passes through a half-wave plate 304 and a third polarization beam splitter 303 and is connected with a second orbital angular momentum modulation module 2; meanwhile, the state of light becomes: $|\varphi\rangle_1=a|H\rangle+\beta|V\rangle$.

Specifically, the upper branch is an upper light path of the first polarization beam splitter 301 in the vertical direction; and the right branch is a right light path of the first polarization beam splitter 301 in the horizontal direction.

Step S3: the first orbital angular momentum modulation module 1 and second orbital angular momentum modulation module 2 adjusts the delay parameters of the first delayer 101 or the second delayer 201 according to the orbital angular momentum state $|\varphi\rangle_{OUT}=a|L_1\rangle+\beta|L_2\rangle$ required to be generated to ensure the time consistency of the two lights; wherein, $|L_1\rangle$ and $|L_2\rangle$ are orbital angular momentum states, $L_1$ and $L_2$ are topology loads, $a^2+\beta^2=1$;

specifically, it is assumed that time of a round-trip light path formed by a first holographic grating switch 103 or a second holographic grating switch 203, a first spiral phase plate 104 or a second spiral phase plate 105, a first total reflector 105 or a second total reflector 205 is defined as $T_0$, and the topological load of the first spiral phase plate 104 is added with $L_0$; then, the relative delay value of the first delayer 101 and the second delayer 201

$$\Delta T = \frac{1}{2}\left|\frac{L_2}{2L_0}T_0 - \frac{L_1}{2L_0}T_0\right|,$$

wherein $$\frac{L_2}{2L_0} \text{ and } \frac{L_1}{2L_0}$$

are integers.

Step S4: incident light simultaneously enters the first orbital angular momentum modulation module 1 or the second orbital angular momentum modulation module 2, after a certain time delay, the first quarter-wave plate 102 or the second quarter-wave plate 202 performs polarization rotation on the polarization state for the first time, and then enters the round-trip light path formed by the first holographic grating switch 103 or the second holographic grating switch 203, the first spiral phase plate 104 or the second spiral phase plate 204 and the first total reflector 105 or the second total reflector 205 for OAM modulation, wherein the light performs round-trip for $$\frac{L_1}{2L_0}$$

times in the first orbital angular momentum modulation module 1; the light performs round-trips for $$\frac{L_2}{2L_0}$$

times in me second orbital angular momentum modulation module 2; the modulated light pulse is emitted along the original light path, namely, passing through the first quarter-wave plate 102 or the second quarter-wave plate 202 and the first delayer 101 or the second delayer 201 again; wherein every time the light pulse passing through the first spiral phase plate 104 or the second spiral phase plate 204 results in the absolute value of the topological charge number of orbital angular momentum plus |L0|; the state of the light at this time becomes: $|\varphi\rangle_2=a|V\rangle|L_1\rangle+\beta|V\rangle|L_2\rangle$ Step S5: after time compensation of the delayer, the modulated light is reflected by the second polarization beam splitter 302 or third polarization beam splitter 303 at the same time and is coupled and output through the beam combiner; the final state of the light at this time becomes: $|\varphi\rangle_{OUT}=|V\rangle(a|L_1\rangle+\beta|L_2\rangle)$.

The orbital angular momentum generating apparatus for polarization modulation of orbital angular momentum and method thereof have the advantages of compact structure, lower manufacturing cost, mature required devices and technology, capability of generating orbital angular momentum states and superposed states with any topological charge number at high speed, and high speed up to the magnitude of MHz, wherein the speed of the apparatus is only limited by the response time of the holographic grating switch.

Specifically, if the round-trip time $T_0$ is equal to the response time of the holographic grating switch $T_s$, and the preset maximum round-trip time is N, then the rate of the entire device is $$\frac{1}{T_0 N};$$

if N=8 and $T_0$=100 ns, the rate of the entire device can reach 1.25 MHz; the rate can even reach the order of GHz with the shortening of the switch response time $T_a$.

Variations and modifications to the above-described embodiments may occur to those skilled in the art based upon the disclosure and teachings of the above specification. Therefore, the present disclosure is not limited to the specific embodiments disclosed and described above, and modifications and variations of the present disclosure are also intended to fall within the scope of the appended claims. Furthermore, although specific terms are employed herein, they are used in a generic and descriptive sense only and not for purposes of limitation.

What is claimed is:

1. An orbital angular momentum generating apparatus for polarization modulation of orbital angular momentum, wherein: a gaussian light source module, a first orbital angular momentum modulation module, a second orbital angular momentum modulation module and a multiplexing module;

the Gaussian light source module comprises a pumping light source and a polarizer;

the pumping light source is used for generating Gaussian pulse light; the polarizer modulates the Gaussian pulse beam into a required polarization state;

the first orbital angular momentum modulation module comprising: a first delayer, a first quarter-wave plate, a first holographic grating switch, a first spiral phase plate and a first total reflector; the first holographic grating switch, the first spiral phase plate and the first total reflector are sequentially connected to form a first round-trip light path;

the second orbital angular momentum modulation module comprising: a second delayer, a second quarter-wave plate, a second holographic grating switch, a second spiral phase plate and a second total reflector; the second holographic grating switch, the second spiral phase plate and the second total reflector are sequentially connected to form a second round-trip light path;

the multiplexing module comprising: a first polarization beam splitter, a second polarization beam splitter, a third polarization beam splitter, a half-wave plate and a beam combiner;

the Gaussian light pulse enters the first orbital angular momentum modulation module or the second orbital angular momentum modulation module, the Gaussian light pulse firstly passes through the first delayer or the second delayer, then the first quarter-wave plate or the second quarter-wave plate rotates the polarization state of the light pulse for the first time, the light pulse enters the first round-trip light path or the second round-trip light path, thus realizing the modulation of the specific orbital angular momentum state by controlling the switching time of the first holographic grating switch or the second holographic grating switch; the modulated light pulses are emitted along the original light path and enter a beam combiner of the multiplexing module to be superposed to generate an orbital angular momentum state or a superposed state.

2. The orbital angular momentum generating apparatus according to claim 1, wherein: the first delayer or the second delayer is used for compensating for the relative time difference caused by the cyclic round-trip modulation in the first orbital angular momentum modulation module or the second orbital angular momentum modulation module.

3. The orbital angular momentum generating apparatus according to claim 1, wherein: when the first quarter-wave plate or the second quarter-wave plate receives incident light, the incident linearly polarized light is converted into circularly polarized light, and when the circularly polarized light is reflected back by the first total reflector or the second total reflector and then passes through the first quarter-wave plate or the second quarter-wave plate again, the circularly polarized light is converted into linearly polarized light which is orthogonal to the polarization state during incidence.

4. The orbital angular momentum generating apparatus according to claim 1, wherein: the first holographic grating switch or the second holographic grating switch generates a Bragg grating in the crystal, and realizes selective reflection of light through the Bragg grating.

5. The orbital angular momentum generating apparatus according to claim 4, wherein: the bragg grating reflects the optical beam when a voltage is applied; the beam is transmitted directly through the crystal when no voltage is applied.

6. The orbital angular momentum generating apparatus according to claim 1, wherein: the first spiral phase plate or the second spiral phase plate is a phase-only diffractive optical element with an optical thickness proportional to the rotational azimuth angle.

7. The orbital angular momentum generating apparatus according to claim 1, wherein: the first polarization beam splitter, the second polarization beam splitter, or the third polarization beam splitter transmits horizontally polarized light and reflects vertically polarized light.

8. The orbital angular momentum generating apparatus according to claim 1, wherein: the half-wave plate converts vertically polarized light into horizontally polarized light.

9. The orbital angular momentum generating apparatus according to claim 1, wherein: the beam combiner is configured to couple the vertically polarized light from the second polarization beam splitter and that from the third polarization beam splitter.

10. An orbital angular momentum generating method for polarization modulation of orbital angular momentum according to claim 1, wherein: comprising the following steps:

step S1: the gaussian light source module generates the corresponding polarization state $|\varphi\rangle_{IN}=a|H\rangle+\beta|V\rangle$ according to the orbital angular momentum state $|\varphi\rangle_{OUT}=a|L_1\rangle+\beta|L_2\rangle$ required to be generated, and transmits to the multiplexing module;

Step S2: when the generated polarization state enters the multiplexing module, the generated polarization state firstly enters the first polarization beam splitter and is divided into an upper branch and a right branch; the right branch passes through a second polarization beam splitter and is connected with the first orbital angular momentum modulation module; the upper branch passes through a half-wave plate and a third polarization beam splitter and is connected with a second orbital angular momentum modulation module; meanwhile, the state of light becomes: $|\varphi\rangle_1=a|H\rangle+\beta|V\rangle$;

Step S3: the first orbital angular momentum modulation module and second orbital angular momentum modulation module adjusts the delay parameters of the first delayer or the second delayer according to the orbital angular momentum state $|\varphi\rangle_{OUT}=a|L_1\rangle+\beta|L_2\rangle$ required to be generated to ensure the time consistency of the two lights; wherein, $|L_1\rangle$ and $|L_2\rangle$ are orbital angular momentum states, $L_1$ and $L_2$ are topology loads, $a^2+\beta^2=1$;

Step S4: incident light simultaneously enters the first orbital angular momentum modulation module or the second orbital angular momentum modulation module, after a certain time delay, the first quarter-wave plate or the second quarter-wave plate performs polarization rotation on the polarization state for the first time, and then enters the round-trip light path formed by the first holographic grating switch or the second holographic grating switch, the first spiral phase plate or the second spiral phase plate and the first total reflector or the second total reflector for OAM modulation, wherein the light performs round-trip for $$\frac{L_1}{2L_0}$$

times in the first orbital angular momentum modulation module; the light performs round-trips for $$\frac{L_2}{2L_0}$$

times in the second orbital angular momentum modulation module; the modulated light pulse is emitted along the original light path;

Step S5: after time compensation of the delayer, the modulated light is reflected by the second or third polarization beam splitter at the same time and is coupled and output through the beam combiner; the final state of the light at this time becomes: $|\varphi\rangle_{OUT} = |V\rangle(a|L_1\rangle + \beta|L_2\rangle)$.

* * * * *